US011343751B2

(12) United States Patent
Bonnet et al.

(10) Patent No.: US 11,343,751 B2
(45) Date of Patent: May 24, 2022

(54) SECURING THE CHOICE OF THE NETWORK VISITED DURING ROAMING

(71) Applicant: ORANGE, Issy-les-Moulineaux (FR)

(72) Inventors: Cedric Bonnet, Chatillon (FR); Sanaa El Moumouhi, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/609,114

(22) PCT Filed: Apr. 20, 2018

(86) PCT No.: PCT/FR2018/050997
§ 371 (c)(1),
(2) Date: Oct. 28, 2019

(87) PCT Pub. No.: WO2018/197790
PCT Pub. Date: Nov. 1, 2018

(65) Prior Publication Data
US 2020/0404584 A1 Dec. 24, 2020

(30) Foreign Application Priority Data
Apr. 28, 2017 (FR) ...................... 1753798

(51) Int. Cl.
*H04W 48/18* (2009.01)
*H04W 48/02* (2009.01)
*H04W 8/02* (2009.01)
(52) U.S. Cl.
CPC ............. *H04W 48/02* (2013.01); *H04W 8/02* (2013.01)

(58) Field of Classification Search
CPC ......... H04W 8/005; H04W 8/18; H04W 8/02; H04W 36/00; H04W 36/0022;
(Continued)

(56) References Cited

U.S. PATENT DOCUMENTS

2007/0281694 A1 12/2007 Lin et al.
2012/0263030 A1* 10/2012 Hahm ................... H04B 1/712
370/201
(Continued)

OTHER PUBLICATIONS

English translation of the Written Opinion of the International Searching Authority dated Jun. 14, 2018 for corresponding International Application No. PCT/FR2018/050997, filed Apr. 20, 2018.
(Continued)

*Primary Examiner* — Jean A Gelin
(74) *Attorney, Agent, or Firm* — David D. Brush; Westman, Champlin & Koehler, P.A.

(57) ABSTRACT

A method for connecting a terminal outside the range of its home network, to a network of a visited area covered by a plurality of networks. The method includes sending a request relating to the connection, including an identifier relating to the visited area, receiving a response message to the request, including a list of at least one network of the plurality of networks, to which the terminal should connect in priority, disconnecting the terminal and connecting the terminal to the priority network of the list. A processing method includes receiving the request including an identifier relating to the visited area, obtaining, on the basis of the identifier, the list of at least one network from the plurality of networks, to which the terminal should connect in priority, and sending a response message to the request, including the list.

15 Claims, 3 Drawing Sheets

Figure 1:
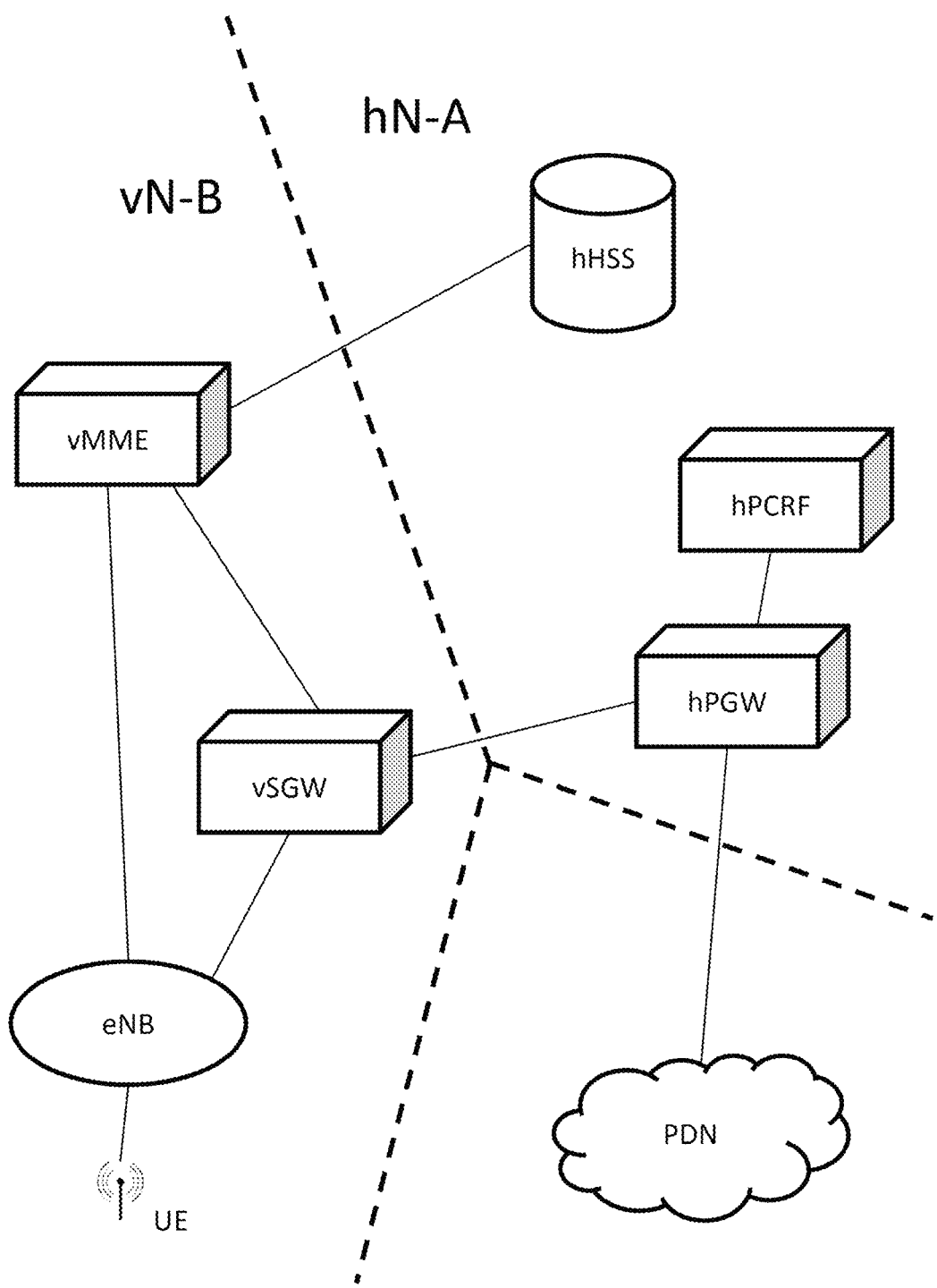

(58) Field of Classification Search
CPC ..... H04W 36/08; H04W 36/22; H04W 48/12; H04W 48/16; H04W 48/18; H04W 48/21; H04W 88/16; H04W 28/0226
See application file for complete search history.

(56) References Cited

U.S. PATENT DOCUMENTS

| | | | |
|---|---|---|---|
| 2013/0318572 A1* | 11/2013 | Singh | H04L 47/10 726/4 |
| 2014/0079022 A1* | 3/2014 | Wang | H04W 36/22 370/331 |
| 2014/0086177 A1* | 3/2014 | Adjakple | H04L 67/10 370/329 |
| 2015/0256993 A1 | 9/2015 | Bellamkonda et al. | |
| 2016/0150450 A1* | 5/2016 | Balasubramanian | G01S 19/01 370/331 |
| 2016/0277917 A1* | 9/2016 | Pirila | H04W 8/02 |
| 2017/0064538 A1* | 3/2017 | Unger | H04W 48/18 |
| 2017/0181027 A1* | 6/2017 | Raleigh | H04W 24/02 |
| 2017/0188275 A1* | 6/2017 | Kim | H04W 8/082 |
| 2018/0167854 A1* | 6/2018 | Enomoto | H04W 36/08 |
| 2018/0206166 A1* | 7/2018 | Ganesan | H04W 36/0011 |

OTHER PUBLICATIONS

International Search Report dated Jun. 7, 2018 for corresponding International Application No. PCT/FR2018/050997, filed Apr. 20, 2018.
Written Opinion of the International Searching Authority dated Jun. 7, 2018 for corresponding International Application No. PCT/FR2018/050997, filed Apr. 20, 2018.

* cited by examiner

SECURING THE CHOICE OF THE NETWORK VISITED DURING ROAMING

CROSS-REFERENCE TO RELATED APPLICATIONS

This Application is a Section 371 National Stage Application of International Application No. PCT/FR2018/050997, filed Apr. 20, 2018, which is incorporated by reference in its entirety and published as WO 2018/197790 A1 on Nov. 1, 2018, not in English.

1. FIELD OF THE INVENTION

The application for an invention lies in the field of mobile communications, and more particularly in the field of the roaming of a subscriber when abroad.

2. PRIOR ART

Mobile operators possess licenses to offer their services in geographical areas generally limited to the territory of a country, or to a part of a country. Certain operators of different areas may nonetheless have roaming agreements which mutually favor their respective subscribers.

In this context, when a subscriber of an operator A is roaming in an area covered by an operator B and by an operator C, and there exists a first roaming agreement between operators A and B, and a second roaming agreement between operators A and C, but operator A prefers the first roaming agreement, the objective is to contrive matters so that the subscriber connects to the visited network of operator B. To this end, a configuration file is pushed to the SIM card of the subscriber's terminal. This file comprises the list of the preferred networks of operator A, including that of operator B. It is then on the initiative of the terminal to choose the preferred network, that is to say the network of operator B, and not that of operator C, when it is in the area common to these two operators.

The scheme adopted for pushing the configuration file in question is based on SMS messages. The terminal's SIM card is updated following the receipt of an SMS message. In order to prevent an operator other than operator A from updating the SIM card, the SMS must comprise a security key specific to the SIM card. This SMS is sent by operator A only when same detects that its subscriber is roaming. It cannot be sent in advance once and for all, before its subscriber exits its area, since the agreements between operators are very frequently modified, as a function of the volumes of traffic that they exchange.

However, some visited operators circumvent this mechanism by detecting and blocking the update SMS. The subscriber's terminal no longer receives the list of preferred operator networks, and selects the attachment network on the basis of other criteria, such as the power of the signal of a relay antenna, and this may unduly favor a network not forming part of the list.

One of the aims of the invention is to remedy these drawbacks of the prior art.

3. DISCLOSURE OF THE INVENTION

The invention seeks to improve the situation with the aid of a method of connecting a terminal beyond the range of its home network, to a network of a visited area covered by a plurality of networks, the method comprising:

the sending of a request relating to the connection, comprising an identifier relating to the visited area, the receipt of a message of response to the request, comprising a list of at least one network of the plurality, to which the terminal must connect by priority, the disconnection of the terminal and its reconnection to the priority network of the list.

In contradistinction to the earlier technique, the home network of the terminal does not depend on a specific signaling, such as an SMS whose delivery is not guaranteed, in order to communicate a list of preferred visited networks to the terminal. The list is inserted into a request-response exchange relating to the connection of the terminal to a first visited network. The home network recognizes the area in which the terminal is situated by virtue of an identifier, for example the PLMN identifier of the first visited network to which the terminal asks to attach itself, or has just attached itself. On receipt of a message comprising the list, which comprises a second visited network, preferred to the first by the home network, the terminal can prioritize this second network for any new connection, as long as it is beyond the range of its home network, that is to say while roaming.

According to one aspect of the connection method, the request is a request for attachment of the terminal to a base station of the network of the visited area.

In this embodiment, it is a request for attachment to the visited network which triggers the receipt of the response comprising the list. The entity for managing the mobility in the visited area sends for example a request for updating the location of the terminal, to a server of the home network, able to manage rights and permissions for the terminal. The response to this request comprises the list.

According to one aspect of the connection method, the request is a request for tracking area updating of the terminal.

In this embodiment, it is a request for tracking area updating which triggers the receipt of the response comprising the list. The entity for managing the mobility in the visited area sends for example a request for updating the location of the terminal to a server of the home network, able to manage rights and permissions for the terminal. The response to this request comprises the list.

According to one aspect of the connection method, the list is encrypted and decryptable with a key previously shared between the terminal and the home network.

In order to guarantee the integrity of the list, and to prevent the visited network from modifying the list to its benefit, or delete it, this list can be encrypted with the aid of a key previously shared between the terminal and its home network, for example a key of type Ki. Thus, if the terminal does not succeed in decrypting the list, or if the list is absent from the expected response message, it can disconnect from the visited network, and recommence the connection method with a different visited network.

The various aspects of the connection method which have just been described can be implemented independently of one another or in combination with one another.

The invention also relates to a method of processing a request relating to the connection of a terminal beyond the range of its home network, to a network of a visited area covered by a plurality of networks, the method comprising:

the receipt of the request comprising an identifier relating to the visited area, the obtaining, on the basis of the identifier, of a list of at least one network of the plurality, to which the terminal must connect by priority, the sending of a message of response to the request, comprising the list.

When a terminal is roaming, for example internationally, that is to say beyond the range of its home network, it sends requests to an entity of the visited network, so as on the one hand to attach itself thereto, and then on the other hand to establish and optionally to modify a session between the terminal and a gateway to a remote entity providing an application.

In a first exemplary initial request, the terminal sends to a base station of the visited area an attachment request, which is transmitted by the base station to an entity for managing the mobility in the visited area.

In a second exemplary initial request, the terminal, already attached, sends to the base station of the visited area an area update TAU request (Tracking Area Update), which is transmitted by the base station to the mobility management entity.

This mobility management entity is for example an MME (Mobility Management Entity) if the networks in question are 4G, and in both cases, the terminal's initial request triggers other requests relating to the connection of the terminal to the visited network, which are sent by the MME of the visited network to the home network. Such a request relating to the connection of the terminal to the visited network is for example a request for location updating ULR (Update Location Request), or a session creation request CSR (Create Session Request).

Advantageously, the home network responds to this request by including in the response message a list of preferred networks, without using signaling dedicated to this list, which would risk being detected as such by the visited network, as may be for example the SMS dedicated according to the earlier technique.

The fact of including the list of preferred networks runs counter to the prejudices of the person skilled in the art, since this list is an item of information that does not respond directly to the request, but which serves to anticipate a future connection of the terminal in the visited area.

Indeed, on receipt of the list, the terminal may decide to interrupt the current connection so as to connect to one of the networks of the list, or on the contrary decide to remain connected and to wait for another event in order to connect to one of the networks of the list, such as for example the end of a session carried by the current connection, or a change of cell inside the visited area.

Moreover, the fact of using existing request and response messages simplifies the implementation of the method in existing equipment. In this instance, only the response message is slightly modified with respect to the existing one, by the addition of the list.

According to one aspect of the processing method, the request is a request for attachment of the terminal to a base station (eNB) of the network (vN-B) of the visited area.

When the terminal's initial request is an attachment request, the entity for managing the mobility in the visited area sends a request for updating the location of the terminal to a server of the home network, able to manage rights and permissions for the terminal. The response to this request comprises the list.

According to one aspect of the processing method, the request is a request for tracking area updating of the terminal.

When the terminal's initial request is a tracking area update, the entity for managing the mobility in the visited area sends a request for updating the location of the terminal to a server of the home network, able to manage rights and permissions for the terminal. The response to this request comprises the list.

According to one aspect of the processing method, the obtaining step is preceded by a step of sending a request for location updating of the terminal.

In this first embodiment, whether the terminal's initial request be an attachment request or a tracking area update, the entity for managing the mobility in the visited area uses a request for location updating of the terminal to obtain the list.

The entity for managing the mobility of the visited network therefore sends a request for updating the location of the terminal to a server of the home network, able to manage rights and permissions for the terminal.

This request triggers the obtaining of the list by the server of the home network, and its sending to the entity for managing the mobility of the visited network.

For example, in 4G, a management entity MME for managing the visited network sends a message ULR to an HSS server of the home network. This message ULR comprises a parameter making it possible to identify the visited area, for example a parameter Visited-PLMN-Id having the structure of a PLMN (Public Land Mobile Network) parameter.

The HSS server obtains a list of preferred networks of the visited area from a database of the home operator. These networks are for example identified by their PLMN. The HSS server inserts the list into a message ULA sent in response to the message ULR.

In its turn, the management entity MME obtains the list by extracting it from the message ULA, and inserts it into a message destined for the terminal, in response to the terminal's initial request.

In 5G, this may be an AMF (Access and Mobility Management Function) entity of the visited network which sends a message of location updating of the terminal to a UDM (Unified Data Management) server of the home network.

According to one aspect of the processing method, the obtaining step is preceded by a step of sending a request for session creation or modification.

In this second embodiment, whether the terminal's initial request be an attachment request or an area update request, the entity for managing the mobility in the visited area uses, to obtain the list, a request for session creation or modification. Here this entails a session, termed IP-CAN in 4G, between the terminal and an Internet access gateway, which allows for example the terminal to exchange data with an application server over the Internet.

The entity for managing the mobility of the visited network therefore sends a request for session creation or modification to a gateway of the home network.

This request triggers the obtaining of the list and its sending, by the gateway of the home network.

In its turn, the management entity MME obtains the list by extracting it from the message sent by the gateway, and inserts it into a message destined for the terminal, in response to the terminal's initial request.

For example, in 4G, a management entity MME for managing the visited network sends a message CSR to a PGW gateway (through an SGW) of the home network. This message CSR comprises a parameter making it possible to identify the visited area, for example the "Serving Network" parameter.

The PGW gateway obtains a list of networks of the visited area from a PCRF entity of the home operator. These networks are for example identified by their PLMN.

In 5G, this may be an AMF entity of the visited network which sends a message to an SMF (Session Management-Function) gateway of the home network (through an SMF gateway of its own visited network) in order to create or modify a session between the terminal and the SMF gateway of the home network so as to join an application server.

It is therefore understood that in order that the terminal receives the list of the preferred visited networks, the processing method which has just been described is implemented:
- either in the mobility management entity MME of the visited network (first embodiment),
- or in the mobility management entity MME of the visited network and in the PGW gateway of the home network (second embodiment).

The invention also relates to a device for connecting a terminal beyond the range of its home network, to a network of a visited area covered by a plurality of networks, the method comprising:
- a sender configured to send a request relating to the connection, comprising an identifier relating to the visited area,
- a receiver configured to receive a message of response to the request, comprising a list of at least one network of the plurality, to which the terminal must connect by priority,
- a processor configured to disconnect the terminal and reconnect it to the priority network of the list.

This device, which implements in all its embodiments the connection method which has just been described, is included in a mobile terminal.

The invention also relates to a device for processing a request relating to the connection of a terminal beyond the range of its home network, to a network of a visited area covered by a plurality of networks, the device comprising:
- a receiver configured to receive the request comprising an identifier relating to the visited area,
- a processor configured to obtain, on the basis of the identifier, a list of at least one network of the plurality, to which the terminal must connect by priority,
- a sender of a message of response to the request, comprising the list.

This device, which implements in all its embodiments the processing method which has just been described, can be included in a management entity MME or in a PGW gateway between terrestrial mobile network and a packet switching network PDN, such as the Internet.

If the terrestrial mobile network is 5G, the device can be included in an AMF entity, or in an SMF gateway.

The invention also relates to a system for processing a request relating to the connection of a terminal beyond the range of its home network, to a network of a visited area covered by a plurality of networks, the system comprising:
- the plurality of networks of the visited area,
- the home network,
- at least one mobile terminal comprising a connection device such as that which has just been described,
- at least one mobility management entity of the visited network, comprising a processing device such as that which has just been described.

According to one aspect of the processing system, it can also comprise at least one gateway of the home network comprising a processing device such as that which has just been described.

The invention also relates to a computer program comprising instructions for the implementation of the steps of the connection method which has just been described, when this program is executed by a processor.

This program can use any programming language, and be in the form of source code, object code, or of code intermediate between source code and object code, such as in a partially compiled form, or in any other desirable form.

The invention is also aimed at an information medium readable by a mobile terminal, and comprising instructions of a computer program such as is mentioned hereinabove.

The invention also relates to a computer program comprising instructions for the implementation of the steps of the processing method which has just been described, when this program is executed by a processor.

This program can use any programming language, and be in the form of source code, object code, or of code intermediate between source code and object code, such as in a partially compiled form, or in any other desirable form.

The invention is also aimed at an information medium readable by a mobility management entity or by a gateway between terrestrial mobile network and the Internet, and comprising instructions of a computer program such as is mentioned hereinabove.

The information mediums mentioned hereinabove can be any entity or device capable of storing the program. For example, such a medium can comprise a storage means, such as a ROM, for example a CD ROM or a microelectronic circuit ROM, or else a magnetic recording means, for example a floppy disk or a hard disk.

Moreover, the information mediums can be a transmissible medium such as an electrical or optical signal, which can be conveyed via an electrical or optical cable, by radio or by other means. One of the programs according to the invention can be in particular downloaded over a network of Internet type.

Alternatively, the information mediums can be an integrated circuit in which the program is incorporated, the circuit being adapted to execute or to be used in the execution of the methods in question.

4. PRESENTATION OF THE FIGURES

Figure 2:
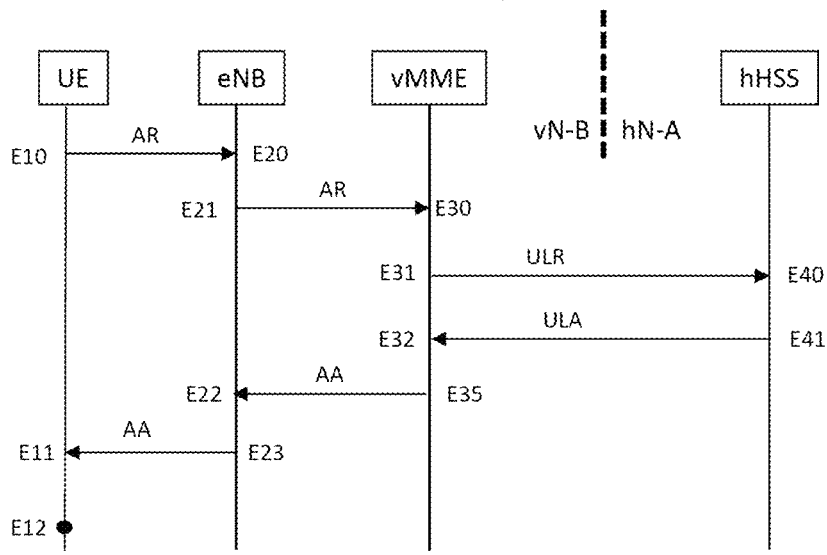
Figure 3:
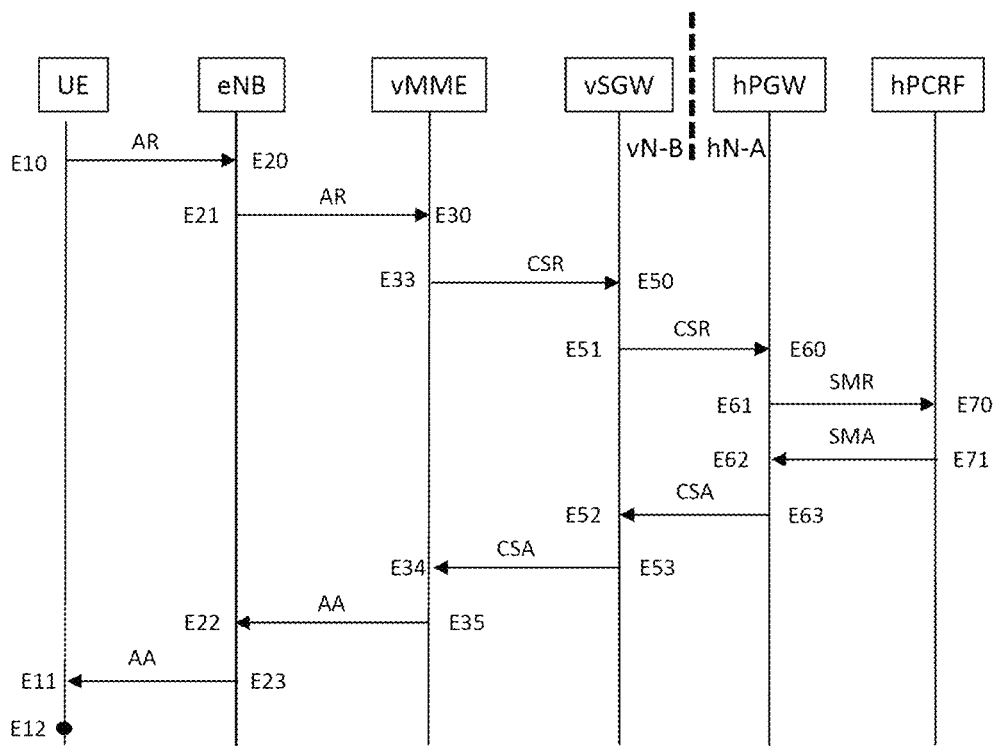
Figure 4:
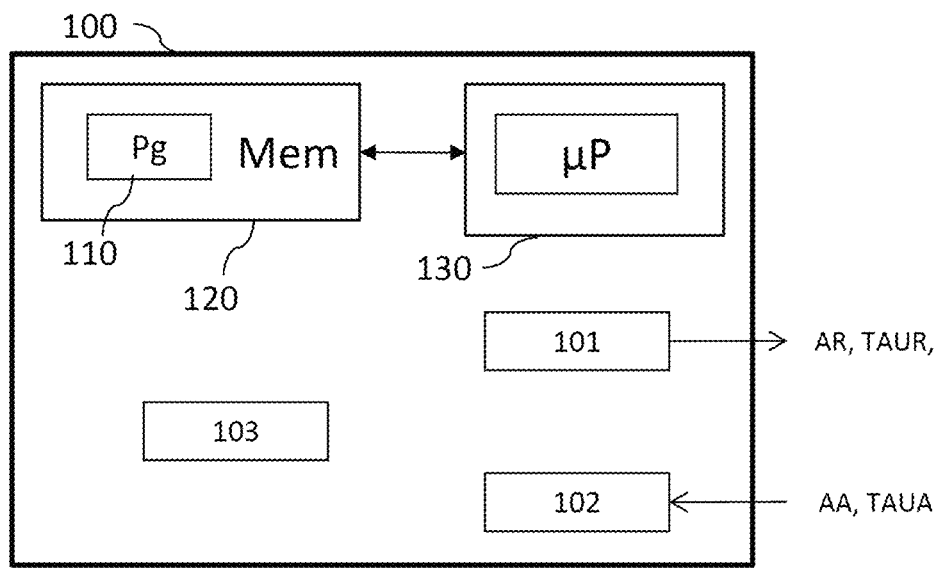
Figure 5:
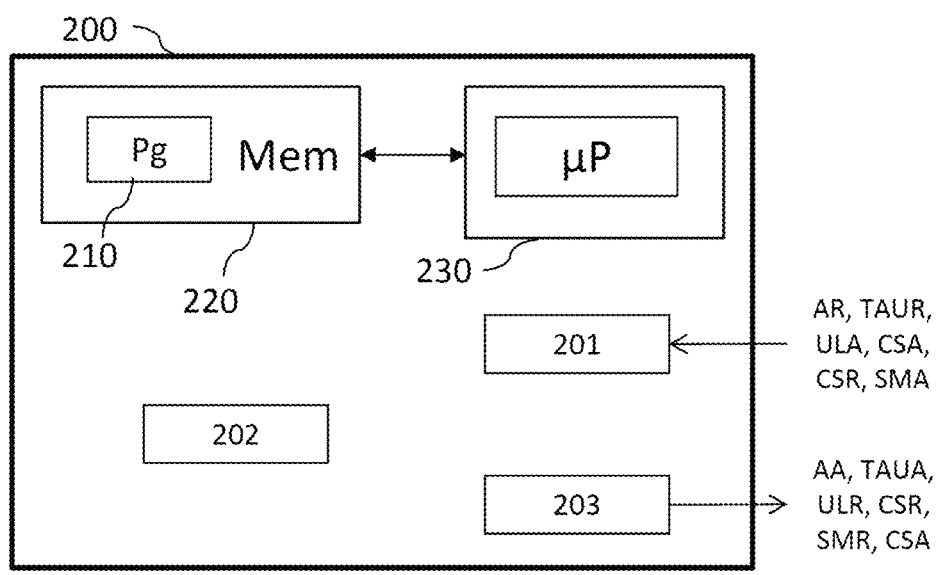

Other advantages and characteristics of the invention will become more clearly apparent on reading the following description of a particular embodiment of the invention, given by way of simple illustrative and nonlimiting example, and of the appended drawings, among which:

FIG. 1 presents an overall view of the architecture elements allowing the implementation of the proposed processing method, FIG. 2 presents an exemplary implementation of the connection method and of the method of processing a request relating to the connection of a terminal while roaming, according to a first embodiment, FIG. 3 presents an exemplary implementation of the connection method and of the method of processing a request relating to the connection of a terminal while roaming, according to a second embodiment, FIG. 4 presents an exemplary structure of a device for connecting a terminal while roaming, according to one aspect of the invention, FIG. 5 presents an exemplary structure of a device for processing a request relating to the connection of a terminal while roaming, according to one aspect of the invention.

5. DETAILED DESCRIPTION OF AT LEAST ONE EMBODIMENT OF THE INVENTION

In the subsequent description, examples are presented of several embodiments based on a 4G mobile network architecture, but the invention also applies to other, earlier or forthcoming, architectures, such as for example a 5G architecture.

FIG. 1 presents an overall view of the architecture elements allowing the implementation of the proposed processing method.

Roaming agreements between operators allow a terminal beyond the range of its home network to connect, when it is within range of at least one visited network.

More precisely, when the terminal UE, whose home network is the network hN-A, is roaming in a visited area at least partially covered by a visited network vN-B, and it attaches itself to a base station eNB of the visited network vN-B, the mobility management entity vMME of the visited network vN-B authenticates the terminal UE by interrogating the database hHSS of the home network hN-A. The new location of the terminal UE is also communicated to a server of registers hHSS of the home network hN-A, so that the terminal UE can be located by its home network, for example for incoming calls.

Thereafter, a session, termed IP-CAN, is established for the terminal UE by the gateway hPGW of the home network hN-A, through at least one gateway vSWG of the visited network vN-B. The characteristics of this session are determined by the function hPCRF of the home network hN-A, and are communicated to the terminal UE. For simplicity, a single gateway is illustrated between the terminal UE roaming in the visited network vN-B and the gateway hPGW of the home network hN-A, but several may be necessary.

The IP-CAN session thus established allows the terminal UE to exchange data with any entity in a packet switching network PDN, such as for example the Internet network, to which the gateway hPGW of the home network hN-A is connected.

The visited area can also be at least partially covered by at least one other terrestrial mobile network vN-C, not illustrated. The home network hN-A may seek to balance, in terms of volume or in terms of cost, the overall traffic with the networks of the visited area. Accordingly, it must be able to inform the terminal about which visited network is preferable.

FIG. 2 presents an exemplary implementation of the connection method and of the method of processing a request relating to the connection of a terminal while roaming, according to a first embodiment.

In this first embodiment, a list of preferred visited networks is provided to the terminal by the home network during the phase of updating the location of the terminal.

In a known manner, during a step E10, the terminal UE sends the base station eNB an attachment request AR. The base station eNB receives it during a step E20 and sends during a step E21 a similar request to the mobility management entity vMME, which receives it during a step E30. Other exchanges, not illustrated, take place thereafter, also in a known manner, where the visited network verifies and authenticates with the home network the identity of the terminal UE.

During a step E31, once the terminal UE has been authenticated, the mobility management entity vMME sends the server hHSS of the home network hN-A a request ULR (Update Location Request) for location updating, in a known manner, for example by using the Diameter protocol.

During a step E40, the server hHSS receives the request ULR and performs customary updating operations, for example with a mobility management entity, not illustrated, of the home network hN-A.

In a novel manner, during a step E41, the server hHSS adds to the message ULA (Update Location Acknowledgement) of acknowledgment of the request ULR a list L of the networks that are preferred, at the time of step E41, by the network hN-A, and sends the acknowledgment message ULA to the mobility management entity vMME, for example by using the Diameter protocol. If it is not the server hHSS that holds the correct list L, it obtains it for example on request from a so-called "roaming steering" entity of the network hN-A.

This list L is preferably limited to the networks which cover the area indicated in the request ULR, in which area the terminal UE is situated. With each of the networks of the list L may be associated a weight indicating an order of preference. Alternatively, the list L may contain just a single preferred network.

The list L may for example be included in a new field of the message ULA, as permitted by the Diameter protocol.

The list L can take the form of a serialized table with at least one network PLMN identifier, optionally accompanied by a weighting coefficient representing its priority relative to the other PLMN identifiers of the list; a PLMN identifier may for example be composed of the network's MCC (Mobile Country Code) and MNC (Mobile Network Code) codes; optionally other indications may accompany each PLMN, such as the technologies present: 2G, 3G, 4G, 5G, WiFi, etc.

During a step E32, the mobility management entity vMME receives the acknowledgment ULA comprising the list L of preferred networks, and optionally stores this list L if necessary so as to add it to another message sent by the mobility management entity vMME.

During a step E35, the mobility management entity vMME responds to the initial request for attachment AR of the terminal UE by a message AA to which the list L is added. For example, the PCO (Protocol Configuration Option) field of the message AA can be used.

During a step E22, the base station eNB receives this response message AA, and transmits it to the terminal UE during a step E23.

During a step E11, the terminal UE receives the message AA comprising the list L of preferred networks, and stores this list L. This list L comprises for example the identifier of a network vN-C, indicated as having priority over the network vN-B.

During a step E12, for example as soon as the terminal UE detects that it is under the coverage of the network vN-C preferred to the network vN-B by the home network hN-A, the terminal UE disconnects from the network vN-B and commences a procedure for connection to the network vN-C, by attaching itself to a base station of this network.

During an alternative step E12, the procedure for connection to the network vN-C can wait for the need to appear, for example if the terminal UE has detached from the base station eNB of the network vN-B for any reason, and if it must reconnect, the terminal UE then commences a procedure for connection to the visited network vN-C rather than vN-B.

FIG. 3 presents an exemplary implementation of the connection method and of the method of processing a request relating to the connection of a terminal while roaming, according to a second embodiment.

In this second embodiment, a list of preferred visited networks is provided to the terminal by the home network during the phase of establishment of the IP-CAN session.

Steps E10, E20, E21 and E30 are identical to the first mode of embodiment and are not described again.

Steps E31, E32, E40 and E41 of the first mode are replaced in this second mode by the steps hereinbelow.

During a step E33, once the terminal UE has been authenticated and its location updated, according to the earlier technique, with the home network hN-A, the mobility management entity vMME sends the gateway hPGW of the home network hN-A a request CSR (Create Session Request) for IP-CAN session creation, in a known manner, for example by using the GTPv2 protocol.

This request CSR is received during a step E50 by a gateway vSWG of the visited network vN-B, which transmits it during a step E51 to the gateway hPGW of the home network hN-A, in a known manner.

During a step E60, the gateway hPGW receives the request CSR.

During a step E61, the gateway hPGW interrogates the function hPCRF of the home network hN-A with a message SMR so as to ascertain the characteristics, also called "PCC rules", that must be allocated to the IP-CAN session requested.

During a step E70, the function hPCRF receives the message SMR, and during a step E71, in a novel manner, it sends the gateway hPGW a message SMA comprising, in addition to the "PCC rules", a list L of the networks that are preferred, at the time of step E71, by the network hN-A. If it is not the function hPCRF which holds the correct list L, it obtains it for example on request from a "roaming steering" entity of the network hN-A.

During a step E62, the gateway hPGW receives the message SMA comprising the list L of preferred networks, and stores this list L.

During a step E63, the gateway hPGW responds to the initial request CSR for IP-CAN session creation with a message CSA (Create Session Response) to which the list L is added. For example, the PCO field of the message CSA can be used.

This response CSA is received during a step E52 by a gateway vSWG of the visited network vN-B, which transmits it during a step E53 to the mobility management entity vMME of the visited network vN-B.

During a step E34, the mobility management entity vMME receives the response CSA comprising the list L of preferred networks, and stores this list L.

The following steps, E35, E22, E23, E11 and E12 are identical to the first embodiment and are not described again.

According to these first two embodiments, the list L is provided to the terminal UE in the context of a procedure for attachment to a base station.

According to other embodiments, not illustrated, the list L is provided to the terminal UE in the same manner, but in the context of a Tracking Area Update, TAU, whilst the terminal UE is already attached to the base station.

In both contexts, whether it be that of an attachment request or of a TAU request, the proposed method does indeed comprise the receipt of a request relating to the connection of the terminal when it is beyond the range of its home network, by the mobility management entity of the visited network (step E30) in the case of the first embodiment described, or, in the case of the second mode, by the mobility management entity of the visited network (step E30) and then by the PGW gateway of the home network (step E60).

An exemplary structure of a device for connecting a terminal beyond the range of its home network (while roaming), according to one aspect of the invention, is now presented in conjunction with FIG. 4.

The connection device 100 implements the connection method of a terminal while roaming, various embodiments of which have just been described.

Such a device 100 is implemented in a mobile terminal able to connect to a terrestrial mobile network, for example of 4G or 5G type.

For example, the device 100 comprises a processing unit 130, equipped for example with a microprocessor µP, and driven by a computer program 110, stored in a memory 120 and implementing the connection method according to the invention. On initialization, the code instructions of the computer program 110 are for example loaded into a RAM memory, before being executed by the processor of the processing unit 130.

Such a memory 120 and such a processor of the processing unit 130 are configured to control:
  a module 103 for disconnecting and reconnecting the terminal to the priority network included in a list of at least one terrestrial mobile network, to which the terminal must connect by priority when it is roaming.

The device 100 also comprises:
  a sender 101, able to send an attachment request AR, or a tracking area update message TAUR,
  a receiver 102, able to receive an attachment response AA, or a tracking area update acknowledgment message TAUA.

An exemplary structure of a device for processing a request relating to the connection of a terminal beyond the range of its home network (while roaming), according to one aspect of the invention, is now presented in conjunction with FIG. 5.

The processing device 200 implements the method of processing a request relating to the connection of a terminal while roaming, various embodiments of which have just been described.

Such a device 200 can be implemented in a mobility management entity of a terrestrial mobile network, able to manage the location of the terminals present in its coverage, such as an MME entity, in a 4G network. The device 200 can also be implemented in a gateway forming the interface between a terrestrial mobile network and the Internet, such as a PGW gateway, in a 4G network.

For example, the device 200 comprises a processing unit 230, equipped for example with a microprocessor µP, and driven by a computer program 210, stored in a memory 220 and implementing the processing method according to the invention. On initialization, the code instructions of the computer program 210 are for example loaded into a RAM memory, before being executed by the processor of the processing unit 230.

Such a memory 220 and such a processor of the processing unit 230 are configured to control:
  an obtaining module 202, able to obtain, on the basis of an identifier relating to the area visited by the terminal while roaming, a list of at least one terrestrial mobile network of the area, to which the terminal must connect by priority.

The device 200 also comprises:
  a receiver 201, able to receive an attachment request AR, or a tracking area update message TAUR, or a location update response ULA, or a session creation or modification response CSA, or a session creation or modification request CSR (of a gateway SGW to a PGW gateway), or a SMA message of "PCC rules" (of a PCRF function to a PGW gateway),
  a sender 203, able to send an attachment response AA, or a tracking area update acknowledgment message TAUA, or a location update ULR, or a session creation or modification request CSR, or a message SMR of request of "PCC rules" (of a PGW gateway to a PCRF function), or a session creation or modification response CSA.

The receiver modules or sender modules described in conjunction with FIGS. 4 and 5 can be hardware modules or software modules.

FIGS. 4 and 5 illustrate only a particular way, from among several possible ways, of carrying out the algorithms detailed hereinabove, in conjunction with FIGS. 2 and 3. Indeed, the proposed methods are carried out interchangeably on a reprogrammable calculation machine (a PC computer, a DSP processor or a microcontroller) executing a program comprising a sequence of instructions, or on a dedicated calculation machine (for example a set of logic gates such as an FPGA or an ASIC, or any other hardware module).

In the case where the proposed methods are embedded in a reprogrammable calculation machine, the corresponding program or programs (that is to say the sequences of instructions) will be able to be stored in removable storage media (such as for example a floppy disk, a CD-ROM or a DVD-ROM) or otherwise, these storage media being partially or totally readable by a computer or a processor.

The invention claimed is:

1. A method comprising:
   connecting a terminal beyond a range of the terminal's home network and in a range of a plurality of networks in a visited area, to a network of the plurality of networks, termed a visited network, the connecting comprising the following acts performed by the terminal:
   sending to the visited network a request to connect the terminal to the visited network,
   receiving from the visited network a response to the request to connect the terminal to the visited network, the response comprising a list of at least one priority network of the plurality of networks, to which the terminal must connect by priority, without sending a request for the list, and
   disconnecting the terminal from the visited network and connecting the terminal to a priority network of the received list.

2. The connection method as claimed in claim 1, where the request to connect is a request for attachment of the terminal to a base station of the visited network.

3. The connection method as claimed in claim 1, where the request to connect is a request for tracking area updating of the terminal.

4. The connection method as claimed in claim 1, where the list is encrypted and decryptable with a key previously shared between the terminal and the home network.

5. A processing method comprising:
   processing a request to connect a terminal beyond a range of the terminal's home network and in a range of a plurality of networks in a visited area, to a network of the plurality of networks, termed a visited network, the processing comprising the following acts performed by a mobility management entity of the visited network or the home network:
   receiving the request to connect the terminal to the visited network,
   in response to receiving the request to connect, inserting in a response to the request to connect, on the basis of an identifier of the visited network, a list of at least one priority network of the plurality of networks, to which the terminal must connect by priority, without receiving a request for the list, and
   sending to the terminal the response to the request to connect.

6. The processing method as claimed in claim 5, where the request to connect is a request for attachment of the terminal to a base station of the visited network.

7. The processing method as claimed in claim 5, where the request to connect is a request for tracking area updating of the terminal.

8. The processing method as claimed in claim 5, where the inserting is preceded by sending a request for location updating of the terminal.

9. The processing method as claimed in claim 5, where the inserting is preceded by sending a request for session creation or modification.

10. A device comprising:
    a sender configured to send a request to connect a terminal a terminal beyond a range of the terminal's home network and in a range of a plurality of networks in a visited area, to a network of the plurality of networks, termed a visited network,
    a receiver configured to receive from the visited network a response to the request to connect the terminal to the visited network, the response comprising a list of at least one priority network of the plurality of networks, to which the terminal must connect by priority, without sending a request for the list, and
    a processor configured to disconnect the terminal from the visited network and connect the terminal to a priority network of the received list.

11. A device comprising:
    a receiver configured to receive a request to connect a terminal beyond a range of the terminal's home network and in a range of a plurality of networks in a visited area, to a network of the plurality of networks, termed a visited network,
    a processor configured to, in response to receiving the request to connect and on the basis of an identifier of the visited network, insert in a response to the request to connect a list of at least one priority network of the plurality of networks to which the terminal must connect by priority, without receiving a request for the list, and
    a sender configured to send to the terminal the response to the request to connect.

12. A system comprising:
    the plurality of networks of a visited area,
    a home network,
    at least one mobile terminal comprising a connection device, which comprises:
    a sender configured to send to visited network a request to connect the mobile terminal beyond a range of the home network and in a range of the plurality of networks in the visited area, to a network of the plurality of networks, termed a visited network,
    a receiver configured to receive from the visited network a response to the request to connect the terminal to the visited network, the response comprising a list of at least one priority network of the plurality of networks to which the mobile terminal must connect by priority, without sending a request for the list, and
    a processor configured to disconnect the mobile terminal from the visited network and connect the mobile terminal to a priority network of the received list, and at least one mobility management entity of the visited network or of the home network, comprising a processing device, which comprises:
- a receiver configured to receive the request to connect the terminal to the visited network,
- a processor configured to insert, in response to the request to connect and on the basis of an identifier of the visited area, the list of the at least one priority network of the plurality of networks to which the mobile terminal must connect by priority, without receiving a request for the list, and
- a sender configured to send the response to the request to connect, comprising the list.

13. The processing system as claimed in claim 12 furthermore comprising:
at least one gateway of the home network, comprising the at least one mobility management entity.

14. A non-transitory computer-readable medium comprising a computer program stored thereon, comprising instructions for implementing a method of connecting a terminal, when this program is executed by a processor of the terminal, wherein the instructions configure the terminal to perform acts comprising:
- sending to the visited network a request to connect the terminal beyond a range of the terminal's home network and in a range of a plurality of networks in a visited area, to a network of the plurality of networks, termed a visited network,
- receiving from the visited network a response to the request to connect the terminal to the visited network, the response comprising a list of at least one priority network of the plurality of networks to which the terminal must connect by priority, without sending a request for the list, and
- disconnecting the terminal from the visited network and connecting the terminal to a priority network of the received list.

15. A non-transitory computer-readable medium comprising a computer program stored thereon, comprising instructions for implementing a method of processing, when this program is executed by a processor of a mobility management entity, wherein the instructions configure the mobility management entity to perform acts comprising:
- receiving a request to connect a terminal beyond a range of the terminal's home network and in a range of a plurality of networks in a visited area, to a network of the plurality of networks, termed a visited network,
- in response to receiving the request to connect, inserting in a response to the request to connect, on the basis of an identifier of the visited network, a list of at least one priority network of the plurality of networks, to which the terminal must connect by priority, without receiving a request for the list, and
- sending to the terminal the response to the request to connect.

* * * * *